(12) United States Patent
Hu et al.

(10) Patent No.: US 10,120,944 B2
(45) Date of Patent: Nov. 6, 2018

(54) SYSTEM AND METHOD FOR ROUTING DATA AND CONNECTING USERS BASED ON USER INTERACTIONS WITH A MACHINE-READABLE CODE OF CONTENT DATA

(71) Applicant: Baidu USA LLC, Sunnyvale, CA (US)

(72) Inventors: Jiangtao Hu, San Jose, CA (US); Guang Yang, San Jose, CA (US); Jingao Wang, Saratoga, CA (US)

(73) Assignee: BAIDU USA LLC, Sunnyvale, CA (US)

(*) Notice: Subject to any disclaimer, the term of this patent is extended or adjusted under 35 U.S.C. 154(b) by 537 days.

(21) Appl. No.: 14/794,688

(22) Filed: Jul. 8, 2015

(65) Prior Publication Data
US 2017/0011127 A1    Jan. 12, 2017

(51) Int. Cl.
G06F 17/30 (2006.01)
(52) U.S. Cl.
CPC .............................. *G06F 17/30867* (2013.01)
(58) Field of Classification Search
None
See application file for complete search history.

(56) References Cited

U.S. PATENT DOCUMENTS

| | | | |
|---|---|---|---|
| 2007/0192168 A1 | 8/2007 | Van Luchene et al. | |
| 2008/0275906 A1 | 11/2008 | Rhoads et al. | |
| 2010/0153211 A1 | 6/2010 | Ramer et al. | |
| 2014/0079374 A1* | 3/2014 | Gehring | H04N 5/782 386/296 |
| 2015/0262221 A1* | 9/2015 | Nakano | G06Q 30/0246 705/14.45 |

\* cited by examiner

*Primary Examiner* — Alex Gofman
*Assistant Examiner* — Umar Mian
(74) *Attorney, Agent, or Firm* — Womble Bond Dickinson (US) LLP

(57) ABSTRACT

In response to a first request for query received from a user device over a network, a search identifier (ID) identifying a search transaction is generated. A search engine performs a search within a content database based on one or more keywords, generating a set of content items. For at least one of the content items, an encoder encodes the search ID and a content ID identifying the content item into a machine-readable code and attaches the machine-readable code to the content item. A search result page is generated by incorporating the set of content items, where at least one of the content items in the search result includes a machine-readable code having the search ID and its content ID encoded therein. The search result page is transmitted to the user device over the network.

24 Claims, 17 Drawing Sheets

| Search ID | User ID | Content ID(s) | Timestamp | User Device Info | Keywords |
|---|---|---|---|---|---|
| 701 | 702 | 703 | 704 | 705 | 706 |
| ... | ... | ... | ... | ... | ... |

Search Event DB
700

FIG. 7A

| User Interaction ID | Search ID | Content ID | Timestamp | User Device Info | Others |
|---|---|---|---|---|---|
| 721 | 722 | 723 | 724 | 725 | 726 |
| ... | ... | ... | ... | ... | ... |

User Interaction DB
720

FIG. 7B

| Agent Interaction ID | Search ID | Content ID | Timestamp | Agent Device Info | Others |
|---|---|---|---|---|---|
| 751 | 752 | 753 | 754 | 755 | 756 |
| ... | ... | ... | ... | ... | ... |

Agent Interaction DB
750

FIG. 7C

| Content ID | Keyword(s) | Description | Link | Agent Info | Others |
|---|---|---|---|---|---|
| 781 | 782 | 783 | 784 | 785 | 786 |
| ⋮ | ⋮ | ⋮ | ⋮ | ⋮ | ⋮ |

Content DB 780

FIG. 7D

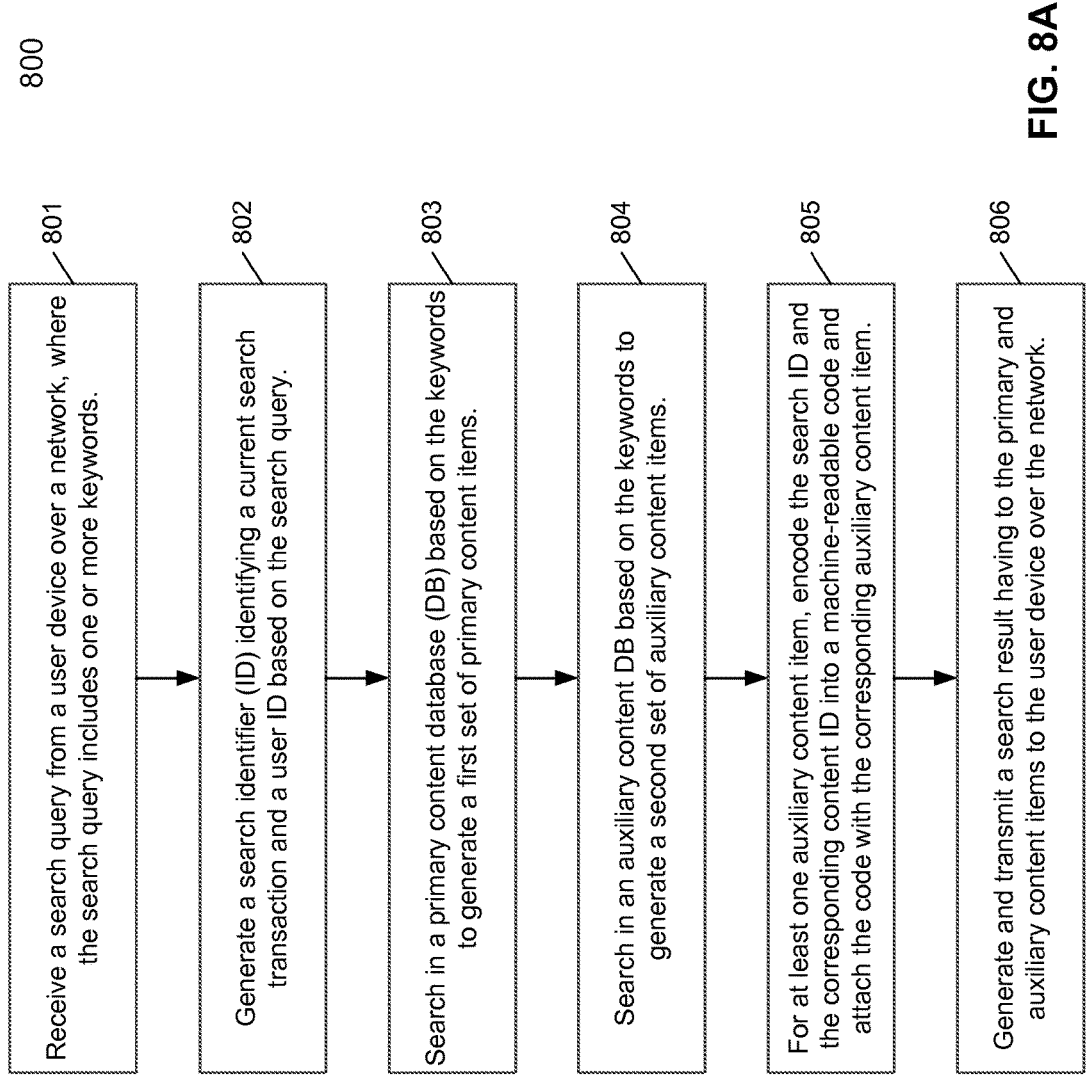

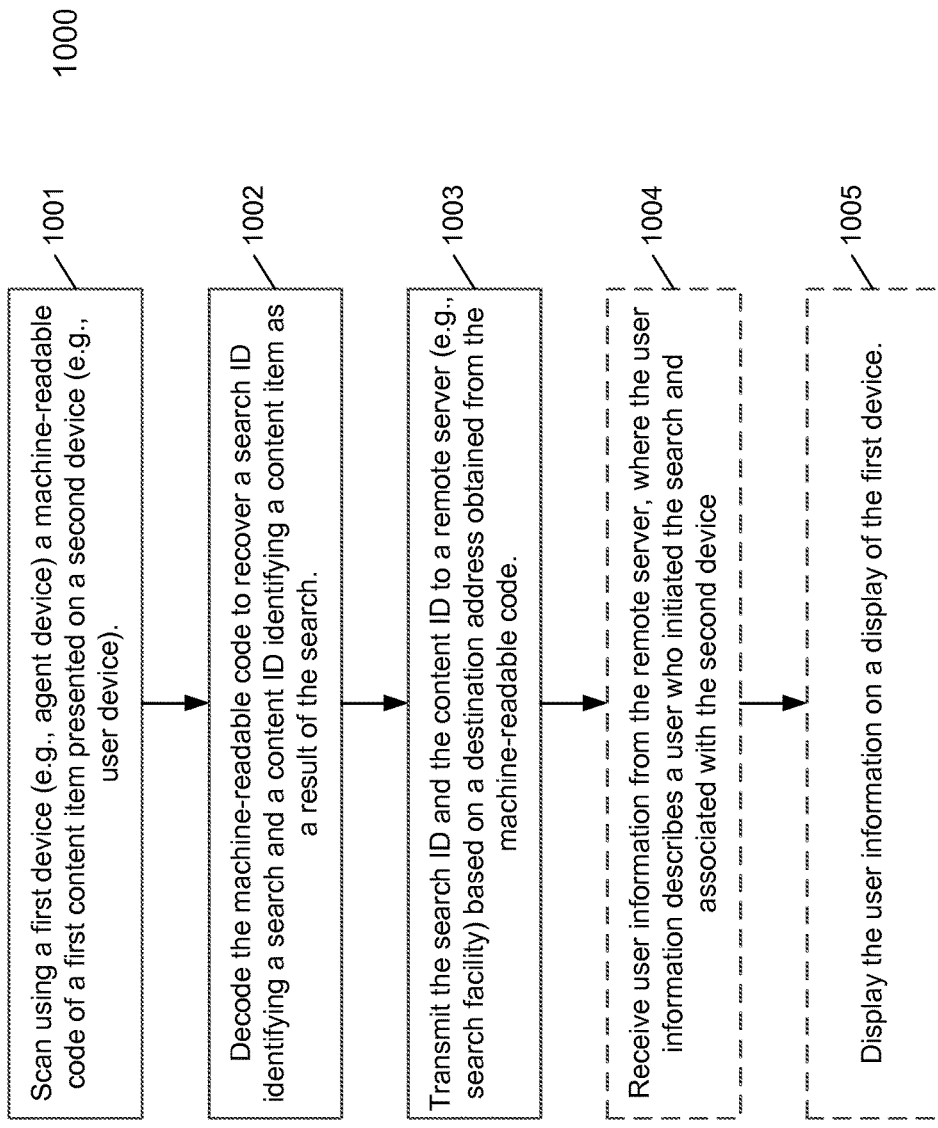

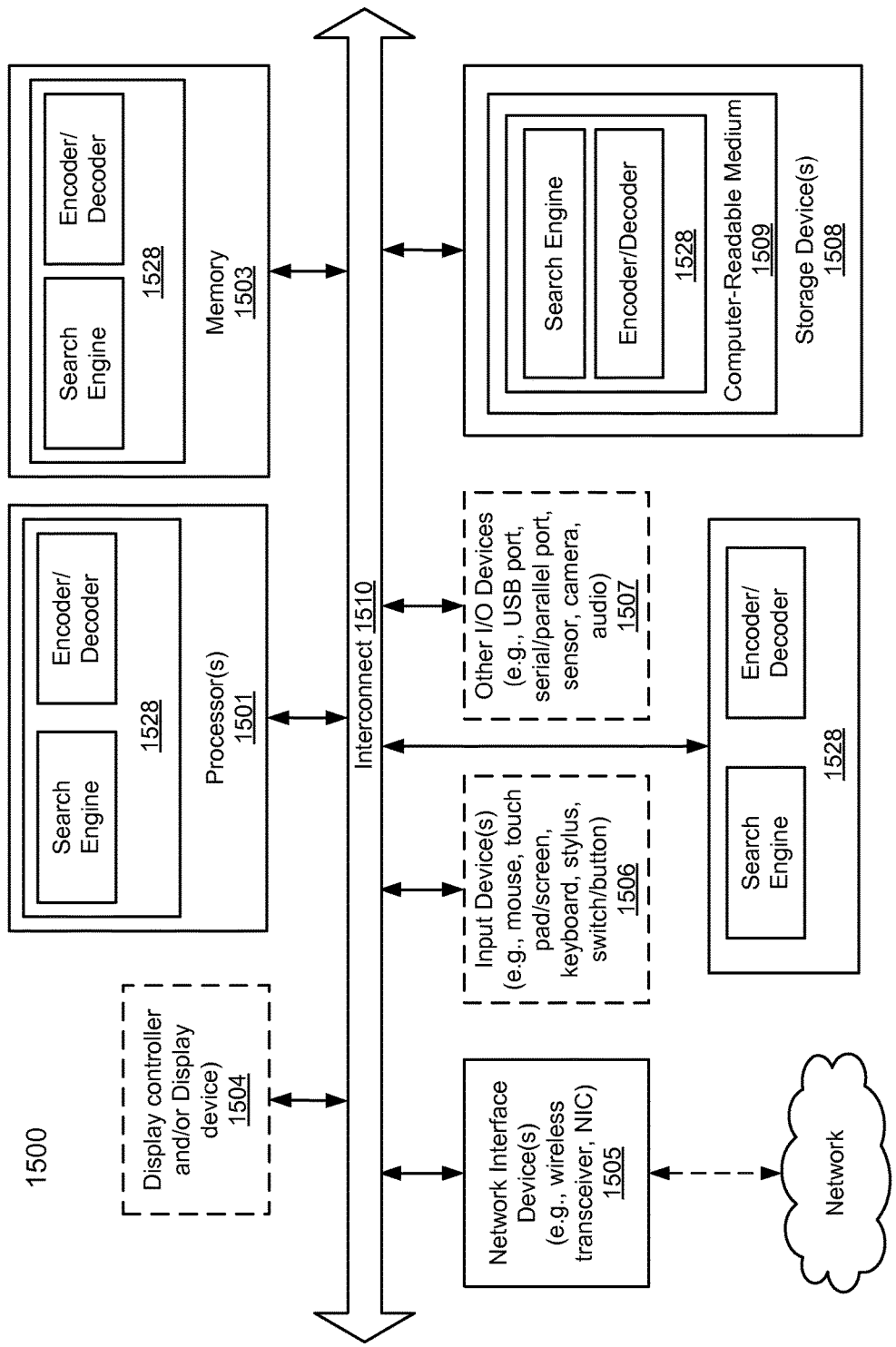

SYSTEM AND METHOD FOR ROUTING DATA AND CONNECTING USERS BASED ON USER INTERACTIONS WITH A MACHINE-READABLE CODE OF CONTENT DATA

FIELD OF THE INVENTION

Embodiments of the present invention relate generally to routing data amongst multiple users. More particularly, embodiments of the invention relate to routing data and connecting users based on user interactions with a machine-readable code of content data.

BACKGROUND

Most search engines typically perform searching of Web pages during their operation from a browser running on a client device. A search engine receives a search term entered by a user and retrieves a search result list of Web pages associated with the search term. The search engine displays the search results as a series of subsets of a search list based on certain criteria. General criteria that is used during a search operation is whether the search term appears fully or partly on a given webpage, the number of times the search string appears in the search result, alphabetical order, etc. Further, the user can decide to open a link by clicking on the mouse button to open and browse. Some of the user interactions with the search results and/or user information may be monitored and collected by the search engine to provide better searches subsequently.

In some situations, a search result in response to a search request initiated by a first user may be forwarded or shared with a second user. The second user may interact with content of the search result. There has been a lack of efficient tracking or monitoring mechanisms to track user interactions from the second user and to connect the first user with the second user.

BRIEF DESCRIPTION OF THE DRAWINGS

Embodiments of the invention are illustrated by way of example and not limitation in the figures of the accompanying drawings in which like references indicate similar elements.

FIGS. 7A-7D are block diagrams illustrating various data structures according to certain embodiments of the invention.

FIGS. 8A and 8B are flow diagrams illustrating a process of performing a search and generating a search result according to some embodiments of the invention.

FIG. 10 is a flow diagram illustrating a process of tracking user interactions with a search result according to one embodiment of the invention.

FIG. 11 is a block diagram illustrating a data processing system according to one embodiment.

DETAILED DESCRIPTION

Figure 1:
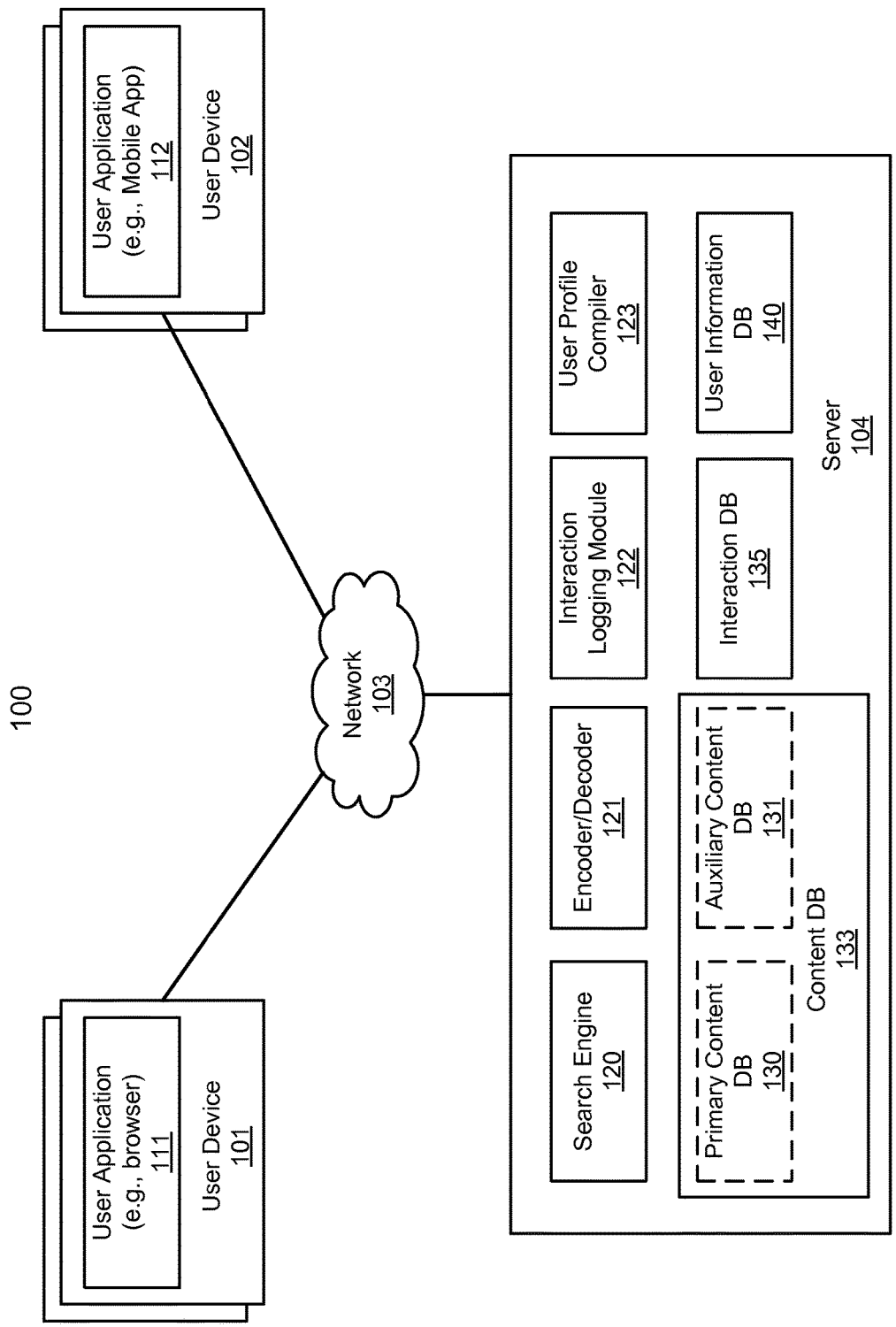
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, in response to a search query received at a server from a first user device of a first user, a search engine associated with the server performs a search in a content database to generate a list of content items. For at least some of the content items, a machine-readable code (MRC) is generated to encode certain search information, user information, and/or content information of the corresponding content item therein. The machine-readable code is then attached to or associated with the corresponding content item. The search result is then transmitted from the server to the first user device. When a content item is accessed or interacted with by the first user, the corresponding machine-readable code may be displayed along with detailed information of the content item.

Subsequently, when a content item of the list of content items in the search result is transmitted from the first user to a second user, the corresponding machine-readable code of the content item may be displayed, scanned, and optionally decoded by a second user device of the second user. In response to the scanning of the machine-readable code, a signal or request is transmitted from the second user device to the server, which originally performed the search and generated the machine-readable code in response to the search query from the first user. The signal or request may contain certain information obtained from the machine-readable code or just the entire machine-readable code.

Based on the information obtained from the machine-readable code, the server correlates and identifies the first user further in view of the search activities associated with the first user. The search activity information may be recorded in a search event database (also referred to as a search activity database) when a search was performed. The server may optionally retrieve user information of the first user from a user information database and/or from the search event database. The server may transmit at least some of the user information of the first user to the second user device of the second user, such that the second user can connect and communicate with the first user. In addition, the user interactions with the corresponding content item and/or the machine-readable code from the first user and/or the second user may be captured and recorded in an interaction database associated with the server, for example, for subsequent analysis.

FIG. 1 is a block diagram illustrating a networked system according to one embodiment of the invention. Referring to FIG. 1, system 100 includes, but is not limited to, one or more client devices 101-102 communicatively coupled to server 104 over network 103. Client devices 101-102, also referred to as user devices, may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Network 103 may be any type of networks such as a local area network (LAN), a wide area network (WAN) such as the Internet, or a combination thereof, wired or wireless.

Server 104 may be any kind of servers or clusters of servers, such as Web or cloud servers, application servers, backend servers, or a combination thereof. In one embodiment, server 104 includes, but is not limited to, search engine 120, encoder/decoder 121, interaction logging module 122, and optional user profile compiler 123. Server 104 further includes an interface (not shown) to allow a client such as client devices 101-102 to access resources or services provided by server 104. The interface may include a Web interface, an application programming interface (API), and/or a command line interface (CLI).

For example, a client, in this example, user application 111 of user device 101, may send a search query to server 104 and the search query is received by search engine 120 via the interface over network 103. In response to the search query, search engine 120 extracts one or more keywords from the search query. Search engine performs a search in content database 133, which may include primary content database 130 and/or auxiliary content database 131, to identify a list of content items that are related to the keywords. Search engine 120 returns a search result page having at least some of the content items in the list to user device 101 to be presented by user application 111. The user application 111 may be a browser application or a mobile application if the user device is a mobile device. Search engine 120 may be a Baidu® search engine available from Baidu, Inc. or alternatively, search engine 120 may represent a Google® search engine, a Microsoft Bing™ search engine, a Yahoo® search engine, or some other search engines.

A search engine, such as a Web search engine, is a software system that is designed to search for information on the World Wide Web. The search results are generally presented in a line of results often referred to as search engine results pages. The information may be a mix of Web pages, images, and other types of files. Some search engines also mine data available in databases or open directories. Unlike web directories, which are maintained only by human editors, search engines also maintain real-time information by running an algorithm on a web crawler.

Web search engines work by storing information about many web pages, which they retrieve from the hypertext markup language (HTML) markup of the pages. These pages are retrieved by a Web crawler, which is an automated Web crawler which follows every link on the site. The search engine then analyzes the contents of each page to determine how it should be indexed (for example, words can be extracted from the titles, page content, headings, or special fields called meta tags). Data about web pages are stored in an index database for use in later queries. The index helps find information relating to the query as quickly as possible.

When a user enters a query into a search engine (typically by using keywords), the engine examines its index and provides a listing of best-matching web pages according to its criteria, usually with a short summary containing the document's title and sometimes parts of the text. The index is built from the information stored with the data and the method by which the information is indexed. The search engine looks for the words or phrases exactly as entered. Some search engines provide an advanced feature called proximity search, which allows users to define the distance between keywords. There is also concept-based searching where the research involves using statistical analysis on pages containing the words or phrases you search for. As well, natural language queries allow the user to type a question in the same form one would ask it to a human.

The usefulness of a search engine depends on the relevance of the result set it gives back. While there may be millions of web pages that include a particular word or phrase, some pages may be more relevant, popular, or authoritative than others. Most search engines employ methods to rank the results to provide the "best" results first. How a search engine decides which pages are the best matches, and what order the results should be shown in, varies widely from one engine to another.

Referring back to FIG. 1, according to one embodiment, in response to a search query received at server 104 from first user device 101 of a first user, search engine 120 performs a search in content database 133, such as primary content database 130 and/or auxiliary content database 131 (also referred to a secondary content database), to generate a list of content items. Each of the content items may be associated with a particular Web page of a particular Web site of a particular content provider via a uniform resource link (URL) and/or a uniform resource identifier (URI). In one embodiment, primary content database 130 stores general content items that have been collected by network crawlers (e.g., unsponsored content). Auxiliary content database 135 stores specific or special content items that are associated with specific, known, or predetermined content providers (e.g., sponsored content). Alternatively, content database 133 may be implemented as a single database without distinguishing primary content database 131 from auxiliary content database 132.

Network crawlers or Web crawlers are programs that automatically traverse the network's hypertext structure. In practice, the network crawlers may run on separate computers or servers, each of which is configured to execute one or more processes or threads that download documents from URLs. The network crawlers receive the assigned URLs and download the documents at those URLs. The network crawlers may also retrieve documents that are referenced by the retrieved documents to be processed by a content processing system (not shown) and/or search engine 120. Network crawlers can use various protocols to download pages associated with URLs, such as hypertext transport protocol (HTTP) and file transfer protocol (FTP).

For at least some of the content items, according to one embodiment, a machine-readable code is generated by encoder 121 to encode certain search information of the search, user information of the first user associated with first user device 101, and/or content information of the corresponding content item therein. A machine-readable code may be a quick-read (QR) code or a barcode. The machine-readable code is then attached to or associated with the corresponding content item. The search result is then transmitted from server 104 to first user device 101. When a content item is accessed or interacted with by the first user, the corresponding machine-readable code may be displayed along with detailed information of the content item.

Subsequently, when a content item of the list of content items in the search result is transmitted from first user device 101 to second user device 102 of a second user, the corresponding machine-readable code of the content item may be displayed, scanned, and optionally decoded by second user device 102 of the second user. In response to the scanning of the machine-readable code, a signal or request is transmitted from second user device 102 to server 104. Note that search engine 120 of server 104 originally performed the search and generated the machine-readable code in response to the search query from first user device 101. The signal or request may contain certain information (e.g., user information of a user who initiated the search, search information, and/or user device information, etc.) obtained from the machine-readable code or just the entire machine-readable code.

Based on the information obtained from the machine-readable code, server 104 correlates and identifies the first user further in view of the search activities associated with the first user from interaction DB 135. The search activity information may be captured and recorded by interaction logging module 122 in interaction database 135 when a search was performed. The server 104 retrieves user information of the first user from user information database 140 and/or from interaction database 135. The server 104 optionally transmits at least some of the user information of the first user, which may be compiled into a user profile by profile compiler 123, to second user device 102 of the second user. As a result, the second user can connect and communicate with the first user based on the user information of the first user in a more friendly and efficient manner. In addition, the user interactions with the corresponding content item and/or the machine-readable code from the first user and/or the second user may be captured and recorded by interaction logging module 122 in interaction database 135 associated with server 104, for example, for subsequent analysis, which may be utilized for providing better search results subsequently.

Figure 2:
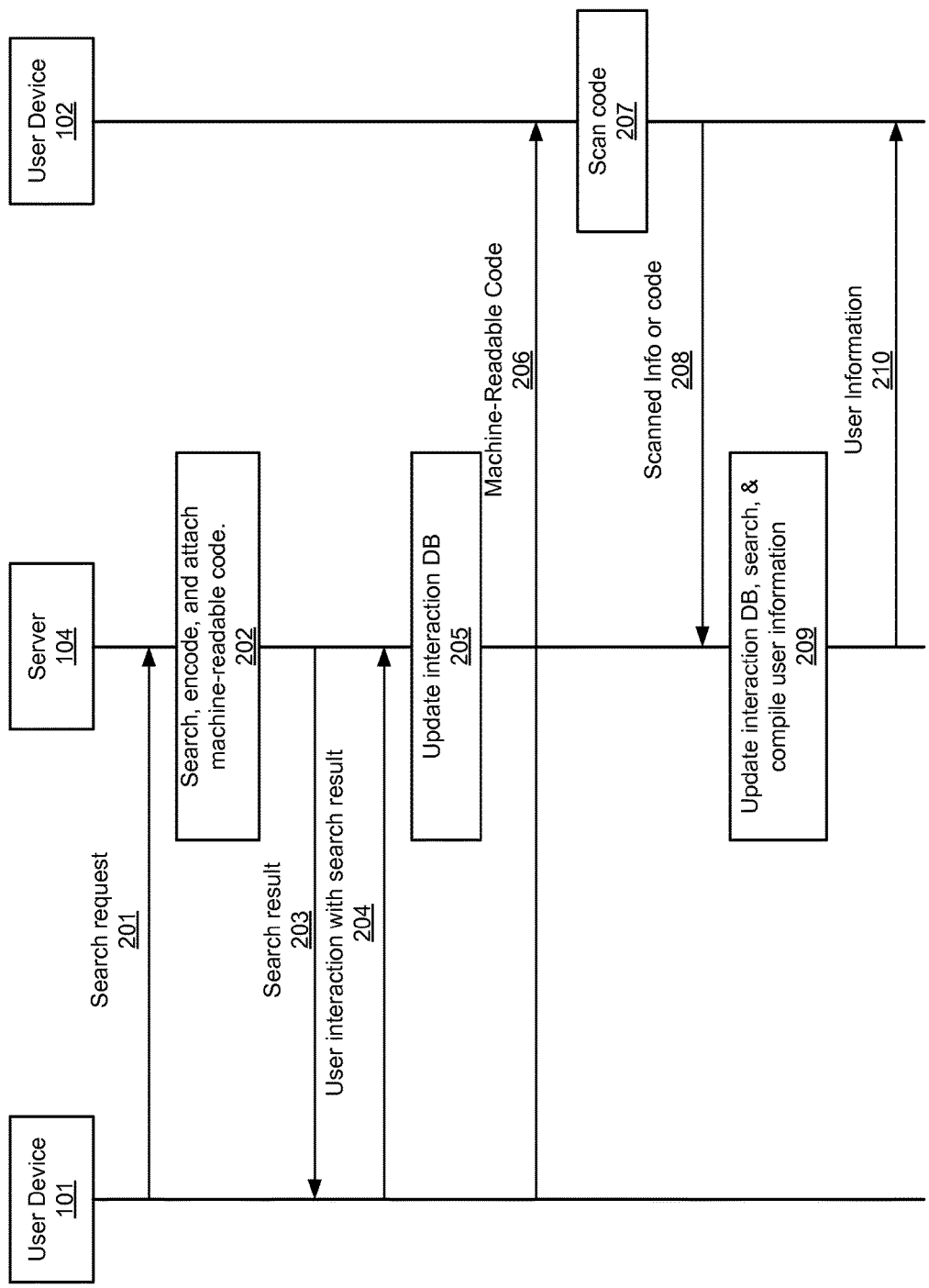
FIG. 2 is a transactional diagram illustrating transactions amongst user devices and server according to one embodiment of the invention.

FIG. 2 is a transactional diagram illustrating transactions amongst user devices and server according to one embodiment of the invention. Referring to FIG. 2, initially, user device 101 sends a search query having one or more keywords to server 104 via path 201. The user of user device 101 may access a search interface of server 104 to enter the one or more keywords from a user application (e.g., browser, mobile application). In response to the search query, at block 202, server 104 searches in a content database based on the keywords to generate a list of content items. For some of those content items, server 104 generates a machine-readable code by encoding certain search information, user information, and/or content information of the corresponding content item. The machine-readable codes are then attached to the associated content items to generate a search result page. The search result page is then returned from server 104 to user device 101 via path 203.

When the user of user device 101 accesses a content item, a signal representing the user interactive event is transmitted to server 104 via path 204. For example, when the search result page is displayed at user device 101 and the user clicks on one of the content item, the detailed information of the content item is displayed together with the corresponding machine-readable code. Meanwhile, a signal or message is transmitted from user device 101 to server 104 via path 204. The signal or message may include information concerning the user, the content item, and the associated search. At block 205, the user interactive information is captured by interaction logging module 122 of server 104 and stored in interaction database 135.

Subsequently, a machine-readable code of a particular content item is transmitted from user device 101 to user device 102 via path 206. For example, the machine-readable code can be shared by emailing, texting, or physically shown from user device 101 to user device 102. At block 207, user device 102 can obtain the machine-readable code by scanning the machine-readable code displayed on a display of user device 101, another device, or some other media (e.g., printed media). User device 102 can decode and send the scanned information from the machine-readable code to server 104 via path 208. Alternatively, user device 102 can simply send the entire scanned machine-readable code to server 104. Based on the scanned information or the machine-readable code, at block 209, server 104 updates the appropriate interaction database concerning the user interactions of user device 102 with respect to the content item and the associated machine-readable code. In addition, server 104 compiles user information of the first user associated with the user device 101 based on the information received from user device 102. Server 104 then optionally sends the user information of the first user of user device 101 to user device 102 via path 210, such that the second user of user device 102 can connect and communicate with the first user of user device 101.

According to one embodiment, user device 101 may be associated with an end user, where user device 101 may be a mobile device (e.g., tablets), a Smartphone, a Smartwatch, or a device capable of communicate with other devices over a network. User device 102 may be an agent device of an agent, a person or an associate associated with a particular entity or organization, where agent device 102 may also be a mobile device (e.g., tablets), a Smartphone, a Smartwatch, or a device capable of communicate with other devices over a network. For example, an agent may be associated with a content provider of a particular content item, in this example, an auxiliary content provider providing a particular auxiliary content item (e.g., sponsored content item). For the purpose of illustration, throughout the present application, communications between a user device, an agent device, and a server will be described to illustrate the techniques of tracking user and agent interactions with content items, routing data amongst a user device, an agent device, and a server, and connecting a user of the user device with an agent of the agent device. However, it will be appreciated the techniques described throughout this application can also be applied to other scenarios.

Figure 3:
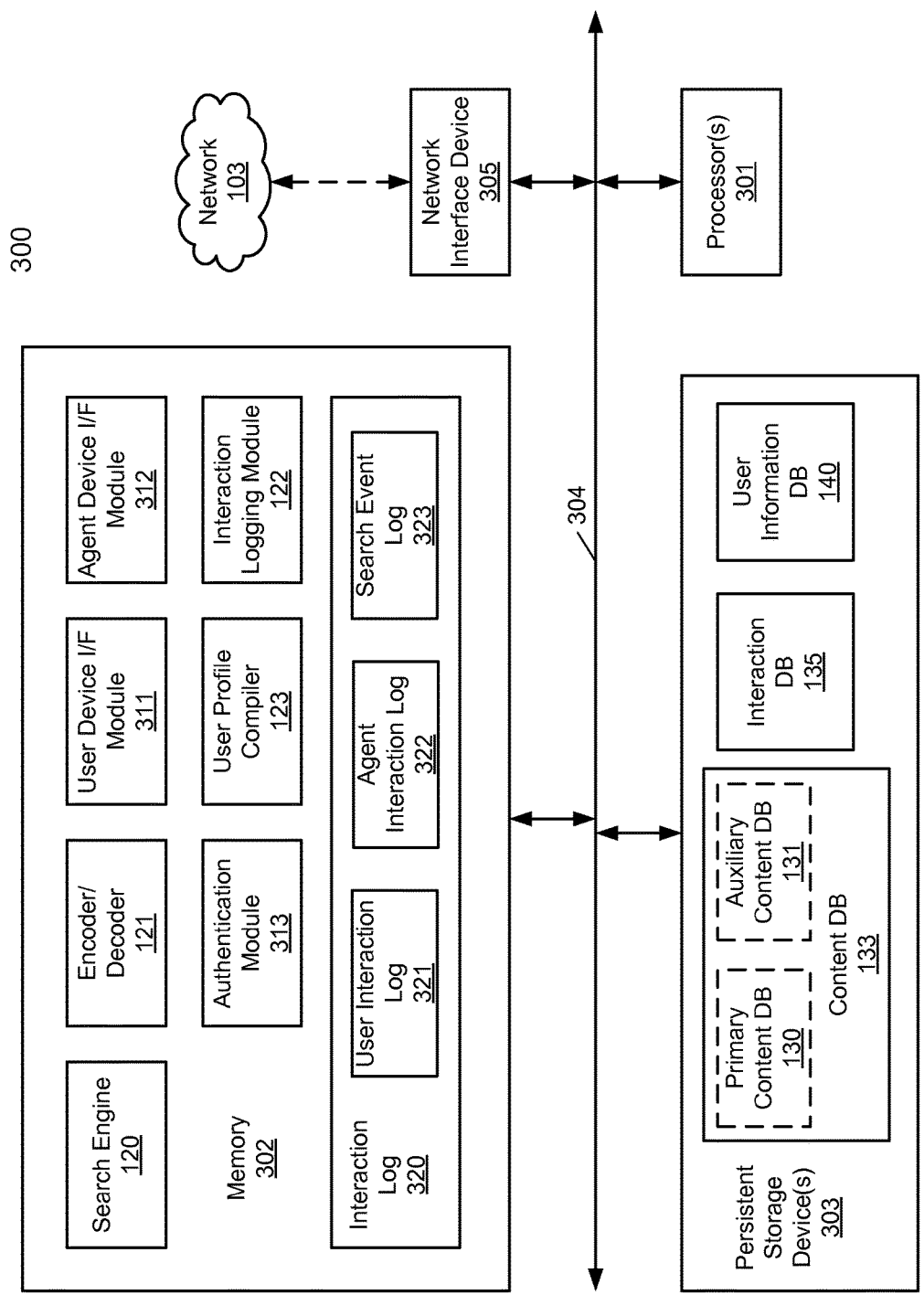
FIG. 3 is a block diagram illustrating a server according to one embodiment of the invention.

FIG. 3 is a block diagram illustrating a server according to one embodiment of the invention. System 300 may represent architecture of server 104 of FIG. 1. For the purpose of illustration, reference numbers of certain components described above having the same or similar functionalities will remain the same. Referring to FIG. 3, system 300 includes search engine 120, encoder 121, interaction logging module 122, and user profile compiler 123 as described above. Search engine 120, encoder 121, interaction logging module 122, and user profile compiler 123 are loaded into memory 302 and executed by one or more processors 301. These components 120-123 may be installed and loaded from persistent storage device 303. Processor(s) 301 may be any kind of processors, such as general-purpose processors (e.g., a central processing unit or CPU) or special-purpose processors. Memory 302 may be any kind of volatile memory such as random-access memory (RAM).

Persistent storage device 303 may be any kind of non-volatile storage devices such as hard disks or flash memory devices. Note that persistent storage device(s) 303 may be local storage devices, storage appliance devices over a storage network, or remote storage servers over a wide area network (e.g., cloud storages). Persistent storage device 303 maintains content database 133 that may include primary content database 130 and/or auxiliary content database 131, interaction database 135, and user information database 140. As described above, primary content database 130 stores primary content items that have been discovered and collected by network crawlers and processed by content processing system(s). Auxiliary content database 131 stores auxiliary content items that are provided by a set of specific, known, or predetermined content providers, such as sponsored content items or advertisements (Ads). Interaction database 135 is used to store any user interactions or agent interactions with search results, content items listed in the search results, and/or machine-readable codes embedded within the auxiliary content items. User information database 140 stores any user information of a variety of users that may or may not have previously accessed resources or services provided by system 300.

In addition, according to one embodiment, system 300 includes user device interface (IF) module 311, agent device IF module 312, and optional authentication module 313 loaded in memory 302 and executed by processor(s) 301. User device IF module 311 is responsible for communicating with user devices and agent device IF module 312 is responsible for communicating with agent devices. Authentication module 313 is configured to authenticate a particular agent of an agent device to verify that the agent is a member of a content provider of the auxiliary content item in question, in order to send the user information of a user to the agent device. In one embodiment, only an authenticated and/or authorized agent, who is associated with a content provider that provides a particular content item, is allowed to receive user information of a particular user accessing that particular content item. Authentication module 313 may invoke a remote authentication, authorization, and accounting (AAA) facility or server to authenticate and/or authorize the agent.

In one embodiment, in response to a search query received from a user device, search engine 120 performs a search in content database 133, which may include primary content database 130 and/or auxiliary content database 131, based on one or more keywords specified in the search query. A list of content items is generated as a result. For at least some of the content items, encoder 121 encodes certain search information, content information of the associated content item, and/or optional user information of the user into a machine-readable code. The machine-readable code is then attached to the corresponding content item. Search engine 120 then transmits a search result page having the machine-readable codes embedded therein to the user device.

Subsequently, when a user of a user device accesses a content item of a search result page, such as clicking the content item displayed at the user device, according to one embodiment, a first signal or message is transmitted from the user device to server 300, where the message is received by user device IF module 311. The information of the first message is then passed to interaction logging module 122 to be logged in user interaction log 321 of interaction log 320. Similarly, when an agent of an agent device accesses a content item shared from the user of the user device, such as scanning a machine-readable code of an auxiliary content item, a second signal or message is transmitted from the agent device to server 300, which is received by agent device IF module 312. The information of the second message is then logged by interaction logging module 122 in agent interaction log 322 of interaction log 320. In response to the second message, user information of the user is compiled by user profile compiler based on information stored in interaction database 135 and user information database 140. The user information is then optionally transmitted by agent device IF module 312 to the agent device. In one embodiment, search event log 323 is used to log search events performed by search engine 120 in response to search requests received from user devices. The information logged in interaction log 320 may be stored in interaction database 135.

Figure 4A:
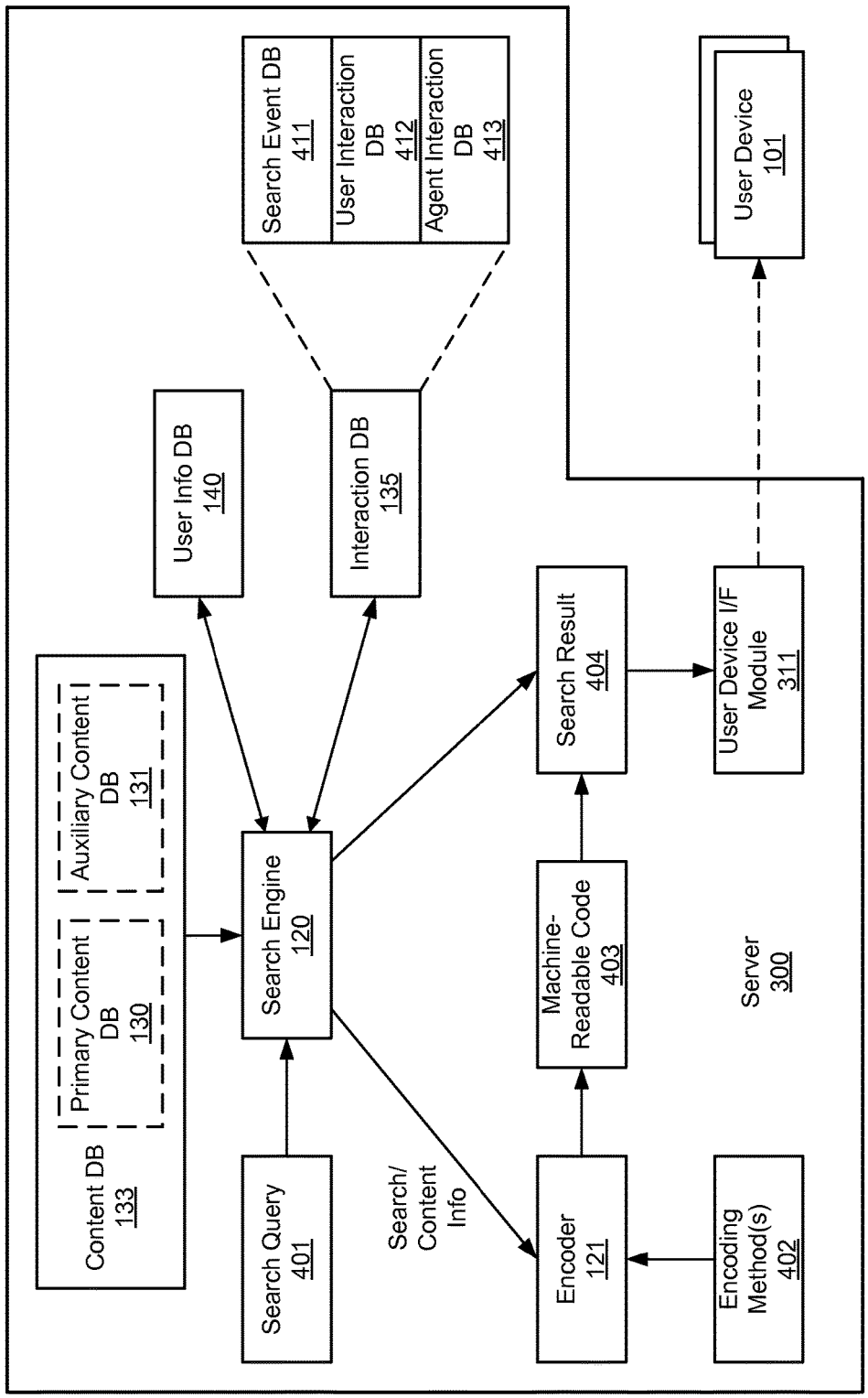
FIGS. 4A and 4B are block diagrams illustrating certain interactions amongst different components according to certain embodiments of the invention.
Figure 4B:
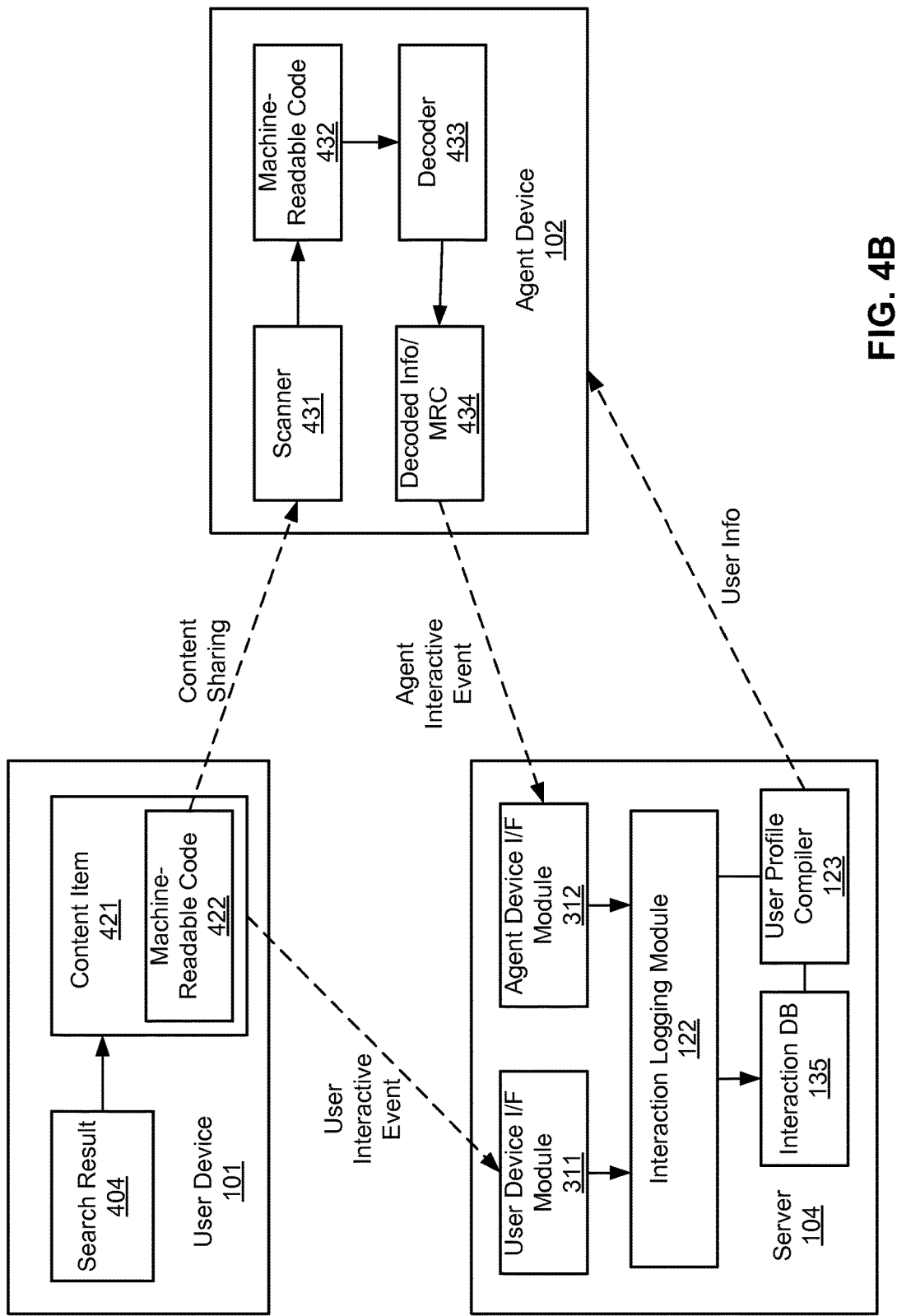

FIGS. 4A and 4B are block diagrams illustrating certain interactions amongst different components according to certain embodiments of the invention. Referring to FIG. 4A, according to one embodiment, in response to search query 401 received at server 300 from a user device of a user over a network, a search identifier (ID) is generated for tracking this particular search activity or event. In addition, a search event entry is created in search event database 411 as part of interaction database 135, where the newly created search event entry is identified by the newly created search ID. In addition, certain user information and/or user device information may be obtained from search query 401 and stored in a user account or entry of user information database 140 indexed based on user identifiers. If this is a new user, a user identifier is generated to represent the new user and a user account in user information database 140 is created.

In one embodiment, search engine 120 performs a first search in primary content database 130 based one or more keywords obtained from search query 401 to generate a first set of primary content items. Search engine 120 performs a second search in auxiliary content database 131 based on the one or more keywords to generate a second set of auxiliary content items. The primary content items may be general content related to the keywords, while the auxiliary content items may be specific types of content or special content related to the keywords provided by predetermined or known content providers (e.g., sponsored content or Ads). Each of the primary content items and auxiliary content items may be identified by a specific content identifier.

For at least one of the auxiliary content items, encoder 121 encodes at least the search ID, corresponding content ID, and/or optional some user information of the first user into machine-readable code 403 using a predetermined encoding method 402. The machine-readable code 403 is then attached to or incorporated with the corresponding content item. Search result page 404 is generated incorporating the first set of primary content items and a second set of auxiliary content items, where at least some of the auxiliary content items include their respective machine-readable codes embedded therein. Search result page 404 is then transmitted to the user device 101 by user device IF module 311 over a network.

Figure 5A:
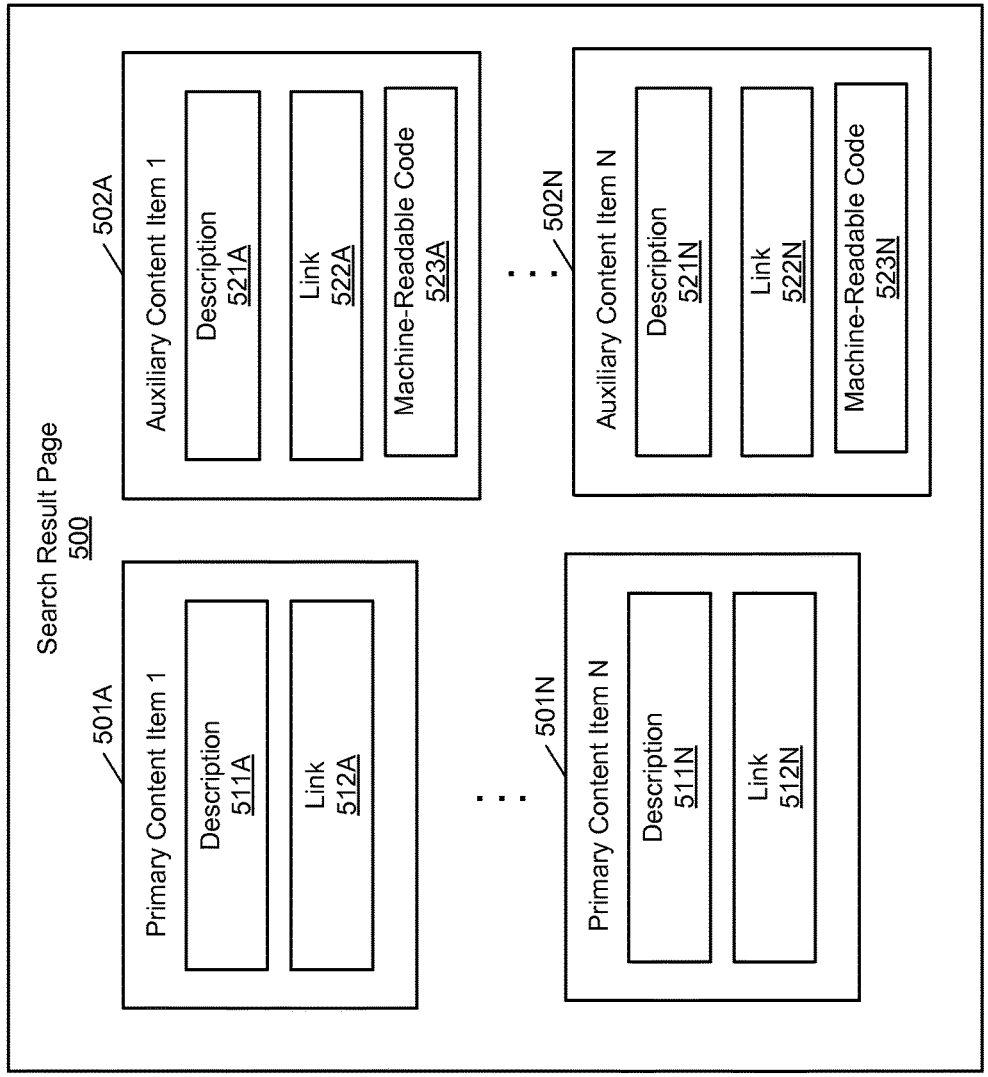
FIGS. 5A and 5B are block diagrams illustrating examples of a search result page according to some embodiments of the invention.

FIG. 5A is a block diagram illustrating an example of a search result page according to one embodiment of the invention. Referring to FIG. 5A, search result page 500 includes a first set of primary content items 501A-501N and a second set of auxiliary content items 502A-502N. Primary content items 501A-501N may be obtained by searching primary content database 130 based on one or more keywords. Auxiliary content items 502A-502N may be obtained by searching auxiliary content database 131 based on one or more keywords. Each of primary content items 501A-1501N includes a brief description (e.g., descriptions 511A-511N) and a link (e.g., links 512A-512N). The link (e.g., URL and/or URI), when activated or clicked, causes a landing page to be retrieved and displayed from a resource location of a Web site determined based on the link.

Similarly, each of auxiliary content items 502A-502N includes a short description (e.g., descriptions 521A-521N) and a link (e.g., links 522A-522N). The link (e.g., URL and/or URI), when activated or clicked, causes a landing page to be retrieved and displayed from a resource location of a Web site associated with a particular content provider (e.g., a content sponsor or Ads provider). In addition, according to one embodiment, at least one of auxiliary content items 502A-502N is associated or attached with a machine-readable code (e.g., machine-readable codes 523A-523N), which may or may not be visible on search result page 500.

When a user accesses or interacts with an auxiliary content item, for example, by clicking link 522A of auxiliary content item 502A, an enlarged or full content page as a landing page is retrieved from a resource location specified by link 522A of a remote web site. The landing page, when displayed, includes the corresponding machine-readable code 523A, which can be shared with another user (e.g., an agent) and scanned by another device (e.g., agent device). In addition, link 522, when activated or clicked by a user, sends a message to a predetermined address of the server (e.g., server 104) that generated search result page 500. The message contains certain search information, content information, and/or user information of the user. Such information may be captured and recorded by interaction logging module 122 and stored as part of user interaction database 412 of FIG. 4A, which may also be referred to as a click event database.

Figure 5B:
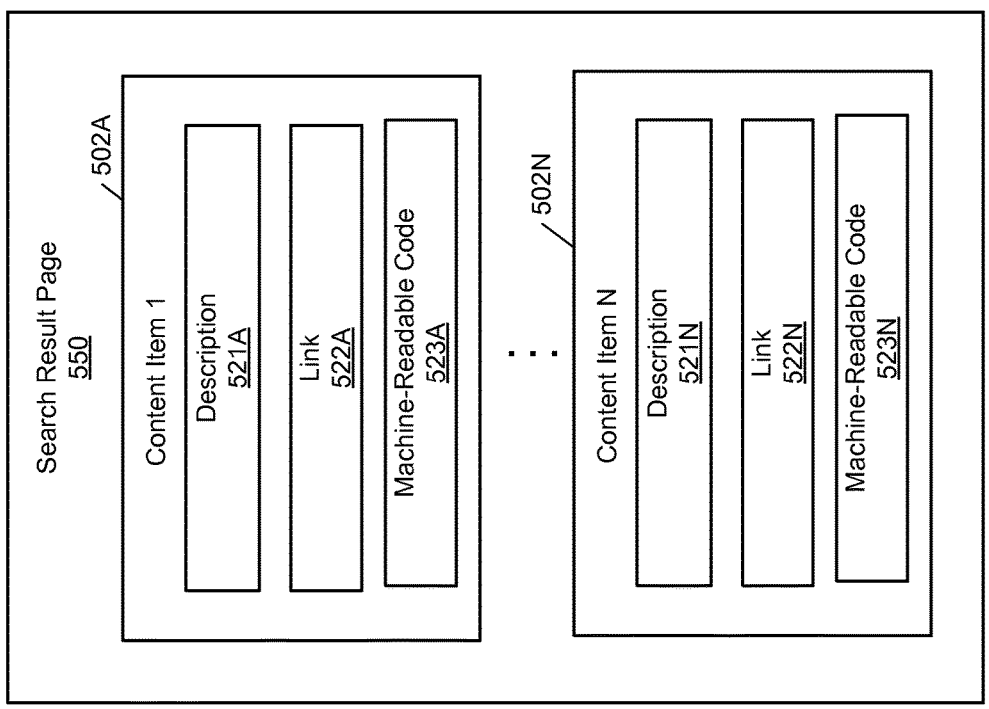

Alternatively, referring back to FIG. 4A, according to another embodiment, content database 133 may be implemented without specific primary content database 130 and auxiliary content database 132. In this example, search engine 120 simply searches in content database 133 to generate a list of content items based one or more keywords obtained from search query 401. Each of the content items may be identified by a specific content identifier. For at least one of the content items, encoder 121 encodes at least the search ID, corresponding content ID, and/or optional some user information of the first user into machine-readable code 403 using a predetermined encoding method 402. The machine-readable code 403 is then attached to or incorporated with the corresponding content item. Search result page 404 is generated incorporating the content items, where at least some of the content items include their respective machine-readable codes embedded therein. Search result page 404, for example, as shown in FIG. 5B, is then transmitted to the user device 101 by user device IF module 311 over a network.

Figure 6:
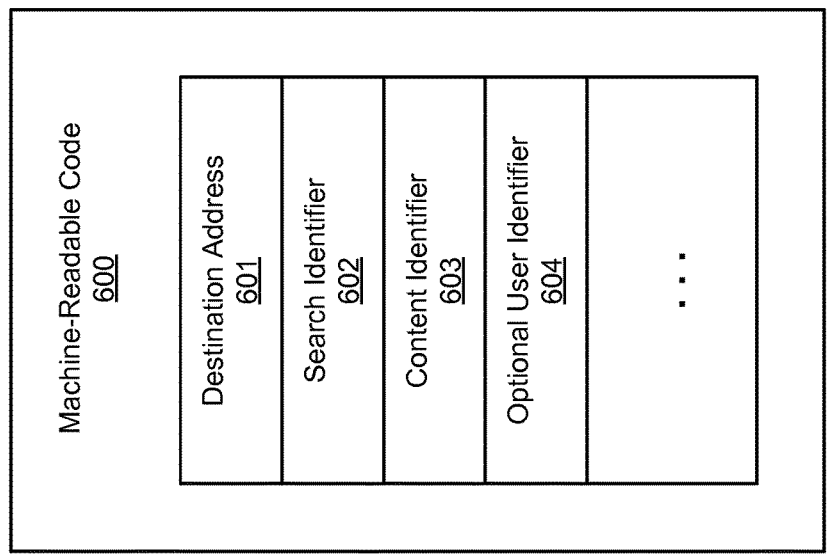
FIG. 6 is a block diagram illustrating an example of a machine-readable code according to one embodiment of the invention.

FIG. 6 is a block diagram illustrating an example of a machine-readable code according to one embodiment of the invention. Referring to FIG. 6, machine-readable code 600 may be generated by encoder 121 by encoding certain search information such as search ID 602, content information such as content ID 603, and optional user information such as user ID 604. Machine-readable code 600 further includes destination address 601 encoded therein, which represents an address of server 104. Search ID 602 may identify a search event or search session performed by search engine 120 in response to a search query received from a user device of a user identified by user ID 604. Content ID 603 identifies a particular auxiliary content item listed in a search result page corresponding to the search event or search session identified by search ID 602.

Referring now to FIG. 4B, search result 404 is received at user device 101 from server 104 in response to a search query initiated from user device 101. Search result 404 may be presented by a search result page as shown in FIGS. 5A and 5B. When the user interacts or clicks on a content item such as a corresponding link of the content item, detailed information of the content item or landing page 421 is retrieved from a resource location of a server associated with a corresponding content provider. Landing page 421 is displayed at user device 101 together with associated machine-readable code 422. In addition, a first message is transmitted from user device 101 to server 104 and received by user device IF module 311. The first message may include a search ID, a content ID, certain user device information of user device 101, and a timestamp representing the time when the user interacts or clicks the content item. Such information may be captured and recorded by interaction logging module 122 and stored in user interaction database 412 as part of interaction database 135.

Subsequently, content item 421 along with machine-readable code 422 may be transmitted or shared with agent device 102 of an agent. The content item 421 may be transmitted (e.g., email, texted, sharing via a social community, or physically presenting) to agent device 102. The agent of agent device 102 may be associated with a content provider of content item 421. In one embodiment, machine-readable code 422 may be scanned or read by scanner or reader 431 becoming machine-readable code 432. Machine-readable code 422 is decoded by decoder 433 to reveal information 434 encoded therein. Agent device 102 then sends a message containing at least a portion of decoded information 434 to server 104 and received by agent device IF module 312. Alternatively, the entire machine-readable code 432 may be sent with the message without decoding. The message includes agent interactive information concerning the corresponding search, the content item, and/or the user of user device 101. The agent interactive information is then captured and recorded by interaction logging module 122 and stored in agent interaction database 413 as part of interaction database 135.

In one embodiment, based on the user interactive information received from user device 101 and agent interactive information received from agent device, user profile compiler 123 searches interaction database 135 to identify the user associated with user device 101 and compiles a user profile of the user based on the information obtained from interaction database 135 and user information database 140. The user profile or the user information of the user is then transmitted to agent device 102, so that the agent of agent device can view or use the user information of the user of user device 101 to connect and communicate with the user.

User information of a user may include a variety of different user information, such as, for example, name, email address, phone number, geographic location, personal interest, prior searches, prior content interactions, gender, age, as well as user device information (e.g., operating system, types or brands of devices, IP or MAC address). Some of the user information may be collected by network crawlers, a third party information provider (e.g., social network, customer relationship management system). Some of the information may be derived by search engine 120 based on the searches initiated by the user and/or interaction logging module 122 based on user interactions with various content.

As described above, the search information or transaction about the current search event or transaction is logged and stored in search event database 411. FIG. 7A is a block diagram illustrating an example of a search event database according to one embodiment of the invention. Search event database 700 may represent at least a portion of search event database 411 of FIG. 4A. Referring to FIG. 7A, search event database 700, also referred to as a search event log, includes multiple search event entries, each corresponding to a search event or search transaction. Each search event entry includes, but is not limited to, search ID 701, user ID 702, content ID(s) 703, timestamp 704, user device information 705, and one or more keywords 706 associated with the search event.

In one embodiment, search ID 701 uniquely identifies the corresponding search event. When a search query is received by the search engine 120, a search ID is created representing the new search event and a new search event entry is created in search event database 700. In addition, user device information 705 is obtained from the search request and user ID 702 may be created to uniquely identify the user. Alternatively, user device information 705 may be used to identify an existing user and its user ID is obtained. User device information 705 may be obtained from a cookie associated with the user or user device.

Cookies are typically implemented as files stored on the requester's computer that indicate the requester's identity or other information required by many web sites. The terms "cookie" and "cookie file" may be used interchangeably. Cookies may include information such as login or registration identification, user preferences, or any other information that a web host sends to a user's web browser for the web browser to return to the web host at a later time.

User device information 705 may include a type of the user device, an operating system of the user device, a type of an application that initiated the search, IP address of the user device, etc. Content ID(s) 703 may identify the content items found during the search. Timestamp 704 represent a time when the search was initiated or performed. Keywords 706 include the keywords extracted from the search query. Other information may also be stored in search event database 700.

FIG. 7B is a block diagram illustrating an example of a user interaction database according to one embodiment of the invention. User interaction database or table 720 may represent at least a portion of user interaction database 412 of FIG. 4A. Referring to FIG. 7B, user interaction event database 720 includes multiple user interaction event entries, each corresponding to a user interaction event. Each user interaction event entry includes, but is not limited to, user interaction ID 721, search ID 722, content ID(s) 723, timestamp 724, optional user device information 705, and other information 706 associated with the corresponding user interaction event.

User interaction database 720 (also referred to as a click event log) is used to track or record user interactions with content items (e.g., sponsored content items or Ads) presented in a search result page in response to a search request. When a user interacts or clicks a content item from a search result page displayed at a user device, a message is transmitted from the user device to server 104. In response to the message, a user interaction ID (also referred to as a click ID) is generated and a user interaction event entry is created identified by the user interaction ID. Search ID field 722 stores a search ID identifying a search or search result page from which the user interacts. Content ID field 723 stores a content ID identifying the content item with which the user interacts. Content ID 723 may also identify a content provider that provides the corresponding content item (e.g., an Ads provider). Timestamp 724 stores a time when the user interacts with the content item. Optionally user device information may be obtained from the message or cookie of the user and stored in field 725.

FIG. 7C is a block diagram illustrating an example of an agent interaction database according to one embodiment of the invention. Agent interaction database or table 750 may represent at least a portion of agent interaction database 413 of FIG. 4A. Referring to FIG. 7C, agent interaction event database 750 includes multiple agent interaction event entries, each corresponding to an agent interaction event. Each agent interaction event entry includes, but is not limited to, agent interaction ID 751, search ID 752, content ID 753, timestamp 754, optional agent device information 755, and other information 756 associated with the corresponding agent interaction event.

Agent interaction database 750 (also referred to as a conversion event log) is used to track or record agent interactions with content items (e.g., sponsored content items or Ads) presented in a search result page in response to a search request. Specifically, agent interaction database 750 is used to track the transfer or conversion of a content item from one user to another user or agent. When an agent receives and interacts a content item from another user, for example, by scanning a machine-readable code of a content item originated from a search result page in response to a search request, a message is transmitted from the agent device to server 104. In response to the message, an agent interaction ID (also referred to as a conversion ID) is generated and an agent interaction event entry is created identified by the agent interaction ID. Search ID field 752 stores a search ID identifying a search or search result page from which the agent interacts. Content ID field 753 stores a content ID identifying the content item with which the agent interacts. Content ID 753 may also identify a content provider that provides the corresponding content item (e.g., an Ads provider). Timestamp 754 stores a time when the agent interacts with the content item. Optionally agent device information may be obtained from the message or cookie of the user and stored in field 755.

FIG. 7D is a block diagram illustrating a content database according to one embodiment of the invention. Content database 780 may represent at least a portion of content database 133 of FIG. 1. Alternatively, content database 780 may represent at least a portion of auxiliary content database 131. Referring to FIG. 7D, content database or table 780 includes multiple entries, each corresponding to a content item identified by a content ID such as content ID 781. Each content entry is associated with one or more keywords 782 for searching purposes. Each content entry may further include description 783 and link 784 referenced to a landing page. Each content entry may further include agent information 785 (e.g., agent login credential, such as username and password) to authenticate an agent. Each content entry may further include other information 786 such as a content provider ID identify a content provider (e.g., a sponsor, Ads provider) that provides the corresponding content item. A content provider may provide multiple content items (e.g., multiple Ads). A content item or content entry may be identified and retrieved from content database 780 by searching based on a search query with keywords and matching those keywords with the associated keywords 782.

FIG. 8A is a flow diagram illustrating a process of performing a search and generating a search result according to one embodiment of the invention. Process 800 may be performed by processing logic that includes hardware (e.g. circuitry, dedicated logic, etc.), software (e.g., embodied on a non-transitory computer readable medium), or a combination thereof. For example, process 800 may be performed by system 300 of FIG. 3. Referring to FIG. 8A, at block 801, processing logic receives a search query having one more keywords from a first user device over a network. In response to the search query, at block 802, a search ID is generated that identifies the current search event or transaction. In addition, a search event entry may be created in a search event database indexed and identified by the newly created search ID to store search information of the current search event.

At block 803, processing logic performs a first search in a primary content database based on the one or more keywords obtained from the search query to generate a first set of one or more primary content items. The primary content items may be general content items discovered by the network crawlers from many sites over networks over a period of time. At block 804, processing logic performs a second search in an auxiliary content database based on the keywords to generate a second set of one or more auxiliary content items. The auxiliary content items may be preconfigured content (e.g., sponsored content, Ads) provided by a set of predetermined or known content providers.

At block 805, for at least one of the auxiliary content items, processing logic encodes the search ID, a content ID, and optional user information of the user device into a machine-readable code. The machine-readable code is then attached to the content item. At block 805, a search result page is generated including at least a portion of the first set of primary content items and a second set of auxiliary content items herein. Alternatively, the search result page may only contain a set of auxiliary content items. At least one of the auxiliary content items includes a machine-readable code embedded therein. The search result page is then transmitted to the user device to be displayed therein. In addition, the search event entry identified by the search ID is updated with the information associated with the search, such as the information as shown in search event database 700 of FIG. 7A.

Subsequently, when the user accesses or clicks at an auxiliary content item, a message is transmitted from the user device to the server, where the message contains certain user interaction information and content identifying information of the interacted content item. In response to the message, a user interaction ID is generated to represent the current user interaction event and a user interactive event entry is created in user interaction database or click event log 412 of FIG. 4A, which is identified and indexed by the newly created user interaction ID. The user interaction information is updated in the newly created user interaction entry, such as those as shown in user interaction database 720 of FIG. 7B.

Figure 8B:
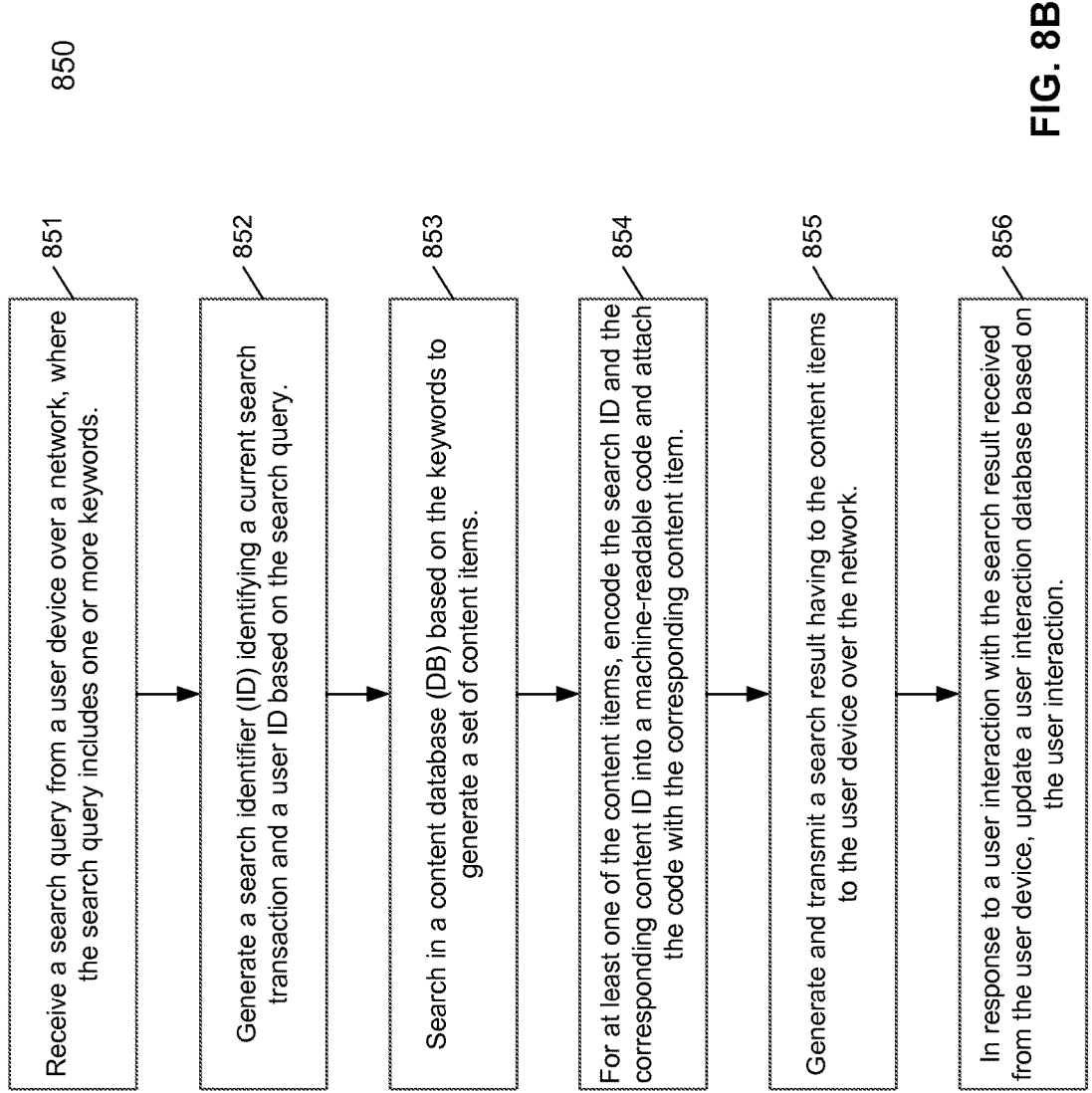

FIG. 8B is a flow diagram illustrating a process of performing a search and generating a search result according to another embodiment of the invention. Process 850 may be performed by processing logic that includes hardware (e.g. circuitry, dedicated logic, etc.), software (e.g., embodied on a non-transitory computer readable medium), or a combination thereof. For example, process 850 may be performed by system 300 of FIG. 3. Referring to FIG. 8B, at block 851, processing logic receives a search query having one more keywords from a first user device over a network. In response to the search query, at block 852, a search ID is generated that identifies the current search event or transaction. In addition, a search event entry may be created in a search event database indexed and identified by the newly created search ID to store search information of the current search event.

At block 853, processing logic performs a search in a content database based on the one or more keywords obtained from the search query to generate a set of one or more content items. At block 854, for at least one of the content items, processing logic encodes the search ID, a content ID, and optional user information of the user device into a machine-readable code. The machine-readable code is then attached to the content item. At block 855, a search result page is generated including at least a portion of the content items herein. At least one of the content items includes a machine-readable code embedded therein. The search result page is then transmitted to the user device to be displayed therein. In addition, the search event entry identified by the search ID is updated with the information associated with the search, such as the information as shown in search event database 700 of FIG. 7A.

Subsequently, when the user accesses or clicks at a content item from the search result, a message is transmitted from the user device to the server, where the message contains certain user interaction information and content identifying information of the interacted content item. In response to the message, at block 856, a user interaction ID is generated to represent the current user interaction event and a user interactive event entry is created in user interaction database or click event log 412 of FIG. 4A, which is identified and indexed by the newly created user interaction ID. The user interaction information is updated in the newly created user interaction entry, such as those as shown in user interaction database 720 of FIG. 7B.

Figure 9:
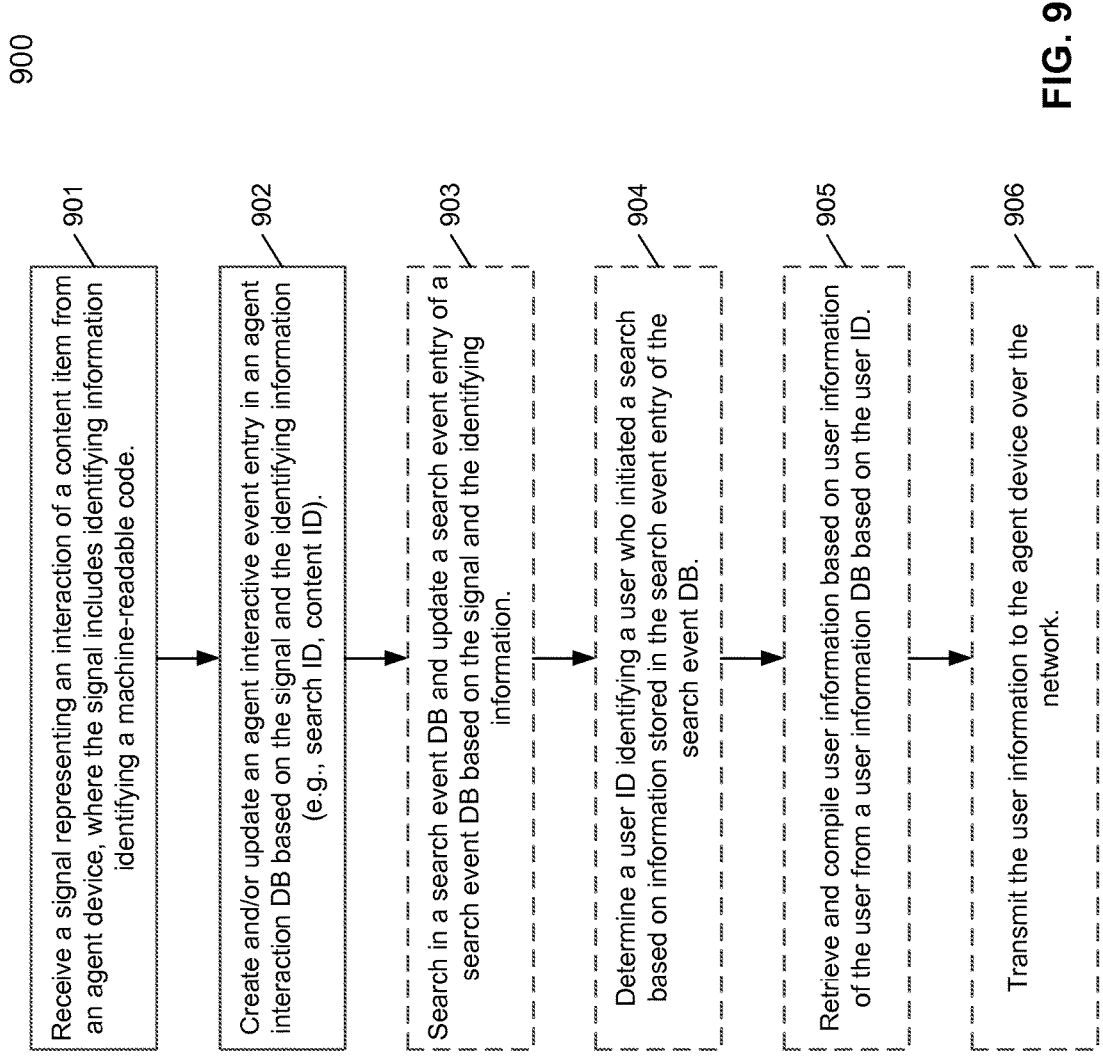
FIG. 9 is a flow diagram illustrating a process of tracking agent interactions with content according to one embodiment of the invention.

FIG. 9 is a flow diagram illustrating a process of tracking agent interactions with content according to one embodiment of the invention. Process 900 may be performed by processing logic that includes hardware (e.g. circuitry, dedicated logic, etc.), software (e.g., embodied on a non-transitory computer readable medium), or a combination thereof. For example, process 900 may be performed by system 300 of FIG. 3. Referring to FIG. 9, at block 901, processing logic receives a request or message from an agent device, where the message includes information identifying a machine-readable code. The machine-readable code may be associated with a content item displayed in a search result page in response to a search query. The identifying information may be the information decoded from the machine-readable code by the agent device, for example, by scanning the machine-readable code received from another user device that received the search result page.

Alternatively, the message includes the actual entire machine-readable code without decoding by the agent device. In such situation, the information embedded within the machine-readable code will be decoded at the server. One of the advantages of this arrangement is the security, in which the agent device does not have to decode and jeopardize the security of the revealed information from the machine-readable code. Rather, the server encodes the information into the machine-readable code during the search and the server is to decode the information itself. No information is likely lost during the transfer or conversion of the corresponding content item.

In response to the message, at block 902, an agent interaction ID is generated to identify the current agent interaction. An agent interaction event entry is created in agent interaction database or conversion log 413 of FIG. 4A, where the agent interaction event entry is identified and indexed by the newly created agent interaction ID. The agent interaction information is then stored in the newly created agent interaction entry, such as those as shown in agent interaction database 750 of FIG. 7C.

At block 903, optionally as indicated in a dash block, processing logic searches in a search event database (e.g., search event database 700 of FIG. 7A) based on a search ID obtained from the message and/or the machine-readable code to locate a search event entry. From the search event entry, at block 904, user information such as a user ID is obtained, where the user initiated the original search identified by the search ID. At block 905, additional user information may be obtained from the user information database and the user information is then transmitted, for example, in a form of a user profile, from the server to the agent device at block 906.

FIG. 10 is a flow diagram illustrating a process of tracking user interactions with a search result according to one embodiment of the invention. Process 1000 may be performed by processing logic that includes hardware (e.g. circuitry, dedicated logic, etc.), software (e.g., embodied on a non-transitory computer readable medium), or a combination thereof. For example, process 1000 may be performed at an agent device such as agent device 102 of FIG. 4B. Referring to FIG. 10, at block 1001, processing logic scans using a scanner of a first device (e.g., an agent device) a machine-readable code associated with a content item presented on a second device (e.g., user device) as a part of a search result page. At block 1002, processing logic decodes the machine-readable code to recover a search ID and a content ID identifying the content item.

At block 1003, the decoded information, such as the search ID and the content ID, as well as certain agent information, is transmitted to a remote server (e.g., the search facility) based on a destination address obtained from the machine-readable code. Alternatively, the entire machine-readable code is transmitted to the remote server without decoding. The remote server is to identify a user who initiated the search and compile user information of the user. At block 1004, user information of the user is received from the remote server and displayed at a display of the first device at block 1005.

The techniques described throughout this application can be used to track search events of content, user interactions with content (including end-user interactions and agent interactions), and transfer or conversion of the content. By encoding and inserting a machine-readable code into a content item, it is more efficient to capture and record when and how users interact with the content in a search result in response to a search query. The information captured and recorded in databases as shown in FIGS. 7A-7C may be subsequently analyzed for the purpose of improving subsequently searches and providing better content to the users.

In one embodiment, the techniques described above can also be applied to tracking online advertisement or Ads interactions and conversions of the Ads (e.g., offline conversions). In a typical search advertising scenario, an advertiser (also referred to as an Ads provider) buys keywords with a search engine of an advertising company and sets up advertisements targeting these keywords. When a user's search query matches one or more of the bought keywords, corresponding advertisements may be shown along with organic search results in the result page. The advertiser may be charged based on how many times their advertisements are shown or clicked on. Alternatively they may be charged based on how many conversions occurred as the result of advertising. Conversions can be either online (such as users visiting the advertiser's website and placing an order) or offline (such as users visiting the advertiser's brick-and-mortar store).

Conversion rate is a key metric to evaluate the effectiveness of advertisements, so an advertiser is usually very interesting in finding out which advertisements lead to conversions. Existing online-to-offline conversion tracking requires manual input of offline conversion data at brick-and-mortar stores, followed by linking of this data back to the online advertising logs in order to determine which conversion is the result of which advertising showing/clicking. Manual input is tedious and error prone, and few advertisers choose to do it in reality.

In one embodiment, a machine-readable code, such as a QR code or a barcode, is attached to each advertisement that may potentially bring a user to an offline conversion. If interested, the user may save the code and show it to a salesperson (e.g., an agent) later when he/she arrives at an offline store such as a retail store. The salesperson may then scan the code with an Internet-connected scanner (e.g., using a mobile application of a mobile device), which sends an event (e.g., with decoded information or the entire code) back to the search advertising company, for example, represented by server 104 of FIG. 1. In this way the offline conversion can be linked back to the advertisement and the conversion can be recorded and reported.

In one embodiment, a machine-readable code associated with a particular Ad will encode a search ID, a timestamp, an advertiser or Ad provider ID, Ad unit ID, etc., so when the machine-readable code is scanned, it can be linked back to the related search and advertisement. Each machine-readable code scanner needs to be authenticated such that it can only scan codes issued for advertisements of the same advertiser (e.g., a particular retail store(s) or retail location(s)). This prevents potential conversion fraud. One implementation is that each scanner must run an application that requires the advertiser to log in with their search advertising credentials, which may be authenticated by authentication module 313 of FIG. 3. Another implementation is for the advertiser to obtain a confidential token from the search advertising company for each of their scanners.

Meanwhile, to encourage users to use the machine-readable code feature, either the search company or the advertiser can provide incentives, e.g. the machine-readable code can act as a coupon. By enforcing checking on the servers, one can allow a code to be used only once or multiple times, and enforce an expiration date. Another incentive for the user to use such a machine-readable code is to encode the user's personal information, e.g. name and address, into the code such that when the salesperson as an agent scans the machine-readable code, these fields can be filled automatically, for example, for potential purchases. This may expedite the sales process. One example is for a hospital visit, in which case the user (patient) typically needs to fill out long forms. This would require the user to have an account with the search engine company and have logged in when doing the search query; in such a case the advertising system may encode the user's personal data into the machine-readable codes. At the end, users receive financial benefits, advertisers receive detailed conversion data to help boost ROI (return of investment), and the search company receives detailed conversion data to help train better advertising models.

Referring back to FIG. 3, system 300 representing a search facility that provides search services to ordinary users in response to search queries. In addition, system 300 also provides searches on Ads provided by advertisers or Ads providers. In this example, primary content database 130 stores regular content that were discovered and/or collected by network crawlers, which may be deployed in many processing nodes or computers. Auxiliary content database 131 represents an Ad database or Ad repository storing Ads that are provided by various Ad providers. Alternatively, content database 133 may only contains Ad database 131, where server 300 represents an Ad server, Ad listing server, or Ad network.

Ad database 131 may include one or more database systems that store various types of data including, but are not limited to, advertisements, click events, price parameter information, and advertiser information including registration information about the advertisers, accounts for the advertisers, payment information, etc. The Ads stored in Ad database 131 may be periodically received and cached from Ad providers, an Ad listings provider of Ad providers, and/or an Ad network of one or more Ad listings providers. Ad database 131 stores copies of advertisements and/or content regarding products or services to serve in the form of advertisements. The advertisements stored in Ad database 131 may be received from various advertisers, such as, for example, merchants, manufacturers, retailers, wholesalers, restaurants, service providers, community organizations, churches, individuals, or any other entity that desires to serve advertisements or other content. In addition to or in place of advertisements, other promotional content may be stored in Ad database 131, such as coupons, discounts, and event notifications.

Ad database 131 may further store advertisement conversion information for each of the advertisements and/or criteria for serving the advertisements. The criteria for serving the advertisements can be received from the respective advertisers. The criteria can be based upon aspects of a search query, a series of search queries, user demographic information, user location information, advertisement bid information, advertisement performance information, information contained in an advertisement request, and/or any other criteria suitable for use in selecting advertisements. The criteria can be received from the advertisers so that the advertiser has control in selecting recipients for their advertisements.

The advertisement conversion information can include, but it is not limited to, for each advertisement, the number of times the advertisement was presented to a user, the number of times the advertisement was selected after being presented, and the number of times one or more specific actions were taken after the advertisement was presented. For example, the specific action may be whether a product subject to the advertisement was added to a shopping cart, purchased online, and/or the recipient of the advertisement visited a location of the advertiser or a merchant that offers the product subject to the advertisement. Ad database 131 can include information for one or more actions, so that each action can be logged and used to compute an advertisement conversion ratio or percentage for that action. An example of an advertisement conversion percentage is the percentage of customers that visit a location associated with an advertisement after receiving the advertisement. Another example of an advertisement conversion percentage is the percentage of customers that visit a location associated with an advertisement after selecting the advertisement using their respective end user device. A further example is the percentage of customers that visit a location associated with an advertisement and have the associated machine-readable codes scanned.

Referring back to FIG. 3, user interaction log 321 represents a click event log tracking click events of the Ads presented in a search result page. Agent interaction log 322 represents an Ad conversion log tracking conversions of the Ads presented in the search result page, including storing the Ad conversion information described above. Click events logged in click event log 321 may be stored in an Ad click event database represented by user interaction database 412 of FIG. 4A. Conversion events logged in Ad conversion log 322 may be stored in an Ad conversion database represented by agent interaction database 413 of FIG. 4A.

Referring now to FIG. 4A, when a user of user device 101 sends a search query to server 104, a search ID is generated to represent the current search event or transaction. Search engine 120 performs a first search in primary content database 130 based on one or more keywords to generate a first set of primary content items. Search engine 120 further performs a second search in Ad database 131 based on the keywords to identify a list of Ads that have been configured to bid on at least one of the keywords. Based on a search result of the primary content database 130 and Ad database 131, a search event entry is created and certain search information, content information, and user information are stored therein as shown in FIG. 7A. In addition, for at least one of the Ads, encoder 121 encodes some of the search information, content information, and user information into machine-readable code 403 to be incorporated into search result 404. Search result 404 is then transmitted to user device 101.

Alternatively, when system 300 represents an Ad server, content database 133 represents an Ad database. In this example, a search query may be received from another server, such as a Web server or content server, for a list of Ads that are related to one or more keywords that are specified in the search query. The request may be received from a Web server that provides regular content search services to clients, such as, for example, Baidu, Google, Microsoft Bing, etc. Alternatively, the request may be received from any client that searches for coupons or other promotion information. In response to the search query, search engine 120 performs a search in content database 133. Thereafter, the processes similar to those described above may be performed.

Referring now to FIG. 4B, when the user accesses search result 404 and clicks at one of the Ads 421, for example, by clicking a link of Ad 421, an enlarged version or full view of Ad 421 is displayed, which may be a corresponding landing page retrieved from a Web site of the corresponding Ad provider. The landing page may include a coupon, discount, or other promotional offer that the customer can redeem if the user checks in at the merchant's retail location or some other online retail sites. The landing page may include information regarding a product or service associated with the advertisement. The landing page may also include directions or information identifying the location of a retail location or other entity that provides the product or service. For example, the landing page may include an address to a retail location or a map having directions for the user's current location to the retail location.

The landing page may also include a promotional offer and directions for redeeming the promotional offer. An agent or employee of the retailer may provide the promotional offer upon check in with the corresponding machine-readable code. The landing page may also include any other information related to the selected advertisement or the advertiser that provides the product or service subject to the selected advertisement. The promotional offer may be in the form of a coupon, discount, reward points, free items, etc.

In addition, referring back to FIG. 4B, a click event is transmitted to server 104 and received by user device IF module 311 and logged by interaction logging module 122 (e.g., a click logging module) into a click event log or database, such as click event log 720 of FIG. 7B. When the user subsequently uses Ad 421, for example, by presenting Ad 421 to an agent of agent device 102 (e.g., sales person of a retail store), agent device scans machine-readable code 422. For example, the use can click on Ad 421 to display machine-readable code 422 on its mobile device 101 and show it to the agent. The agent can use a mobile application running in its mobile device 102 to scan machine-readable code 422. Such scanning is considered as an Ad conversion and a conversion event is sent to server 104 and received by agent device IF module 312. The information of the Ad conversion is then captured and stored in an Ad conversion database as shown in FIG. 7C.

In response to the Ad conversion event, certain user information of the user who clicked and presented the Ad is obtained and transmitted back to agent device 102 to be displayed therein. As a result, the agent has more information of this particular customer and better serve the customer, such as, for example, by offering more discount, recommending another product the user may be interested, etc. Customer satisfaction can be improved. By tracking the Ad conversion and providing more user information, an offline conversion of an online Ad can be easily tracked and a sales transaction is more likely completed. More Ad providers are willing to utilize the Ad system provided server 104.

Referring to FIG. 7A, search event database or search event log 700 records search events on the Ads. Content ID 703 may represent an Ad ID identifying a particular Ad or Ad provider. A search event entry may further record an Ad group ID of a particular Ad. A cost unit for each click of the Ad. A cost unit represents a cost that a corresponding Ad provider will pay for each click event of the Ad. User device information may include an IP address of the user device, an application used to access the Ad (e.g., browser), an operating system of the user device, and a creative ID identifying a creative element of the Ad.

Referring to FIG. 7B, click event database 720 records click events of the Ads, where each click event entry is identified by a click ID. User interaction ID 721 represents a click ID identifying a click event. Content ID 723 represents an Ad ID identifying an Ad or an Ad provider. Each click event entry may further includes a cost unit of a click event. Referring to FIG. 7C, conversion event database 750 records conversion events of the Ads, where each conversion event is identified by a conversion ID. Agent interaction ID 751 represents a conversion ID identifying a conversion event. Content ID 753 represents an Ad ID identifying an Ad or an Ad provider. Conversion event database 750 may further record a conversion type and a conversion value of each Ad. Conversion event database 750 may further store Ad conversion information described above. The information stored in click event database 720 and/or conversion event database 750 may be subsequently sent to a remote system for analysis.

According to some embodiments, server 104 provides content search services for customers, operates as or on behalf of an Ad listings provider providing Ad listings services for various Ad providers, and provides tracking services of Ad interactions and conversions. In such a system, advertisement providers register and provide payment information, one or more price parameters (e.g., an amount an advertiser is willing to pay for each click, bid amount, price information, other measure of price, etc.) and associated advertisements (also referred to as creatives) associated with the price parameter. For example, Ad providers may provide their price parameter(s) in association with a keyword for use in a search engine system. An Ad provider is only obligated to pay if a user meets some performance parameter (e.g., clicks-through the Ad to the landing page target provided by the Ad provider associated with the Ad, activates a coupon, becomes a registered user, purchases an item, etc. In addition, an Ad listings provider may only be paid when a certain performance parameter is achieved (e.g., a click-through occurs or a conversion occurs, in this example, scanning of the machine-readable code).

Note that some or all of the components as shown and described above (e.g., search engine 120, encoder/decoder 121, interaction logging module 122, etc.) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

FIG. 11 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, a search engine, an encoder, an interaction logging module as described above. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for routing data and connecting users based on user interactions with content, the method comprising:
   in response to a first request for query received at a server from a user device over a network, the query including one or more keywords, generating by a search engine hosted by the server a search identifier (ID) identifying a search transaction corresponding to the query;
   extracting the one or more keywords from the query;
   performing, by the search engine, a search within a content database based on the extracted one or more keywords, generating a set of one or more content items;
   for at least one of the content items,
      encoding, by an encoder, the search ID and a content ID identifying the content item into a machine-readable code using a predetermined encoding algorithm, and
      attaching the machine-readable code to the corresponding content item, the machine-readable code having the search ID and the corresponding content ID encoded therein;
   generating a search result page by incorporating the content items therein, at least one of the content items in the search result page including a corresponding machine-readable code attached therein;
   transmitting the search result page to the user device over the network such that the search result page is displayed on the user device, wherein detailed information of the at least one of the content items and the corresponding machine-readable code from the search result page are displayed on the user device when a user of the user device clicks on the at least one of the content items, the corresponding machine-readable code being scannable from the user device;
   receiving at the server a second request from an agent device of an agent over the network, the second request including identifying information identifying a first machine-readable code associated with a first content item of the content items in the search result page, wherein the first machine-readable code is transmitted from the user device to the agent device over a communication path;
   in response to the second request,
      extracting by an interaction logging module the search ID and a first content ID from the identifying information;

determining a user ID identifying the user of the user device who initiated the first request based on the search ID and the first content ID; and compiling by a user profile compiler user information of the user based on information obtained from a user information database based on the user ID.

2. The method of claim 1, further comprising:

in response to the second request, updating an agent interaction database storing agent interactive event information based on the second request, wherein the agent interaction database includes a plurality of agent interactive event entries indexed by a plurality of agent interactive IDs, each agent interactive event entry corresponding to an agent interactive event representing an agent interaction with a particular content item.

3. The method of claim 2, wherein the identifying information identifying the first machine-readable code was obtained by the agent device by scanning the first machine-readable code presented at the user device as part of the search result page.

4. The method of claim 2, further comprising:

transmitting the user information of the user from the server to the agent device to enable the agent to communicate with the user based on the user information.

5. The method of claim 2, wherein the identifying information of the first machine-readable code contains the entire first machine-readable code, and wherein the method further comprises decoding the first machine-readable code to obtain the search ID and the first content ID.

6. The method of claim 2, wherein encoding the search ID and a corresponding content ID into a machine-readable code comprises:

encoding the search ID into the first machine-readable code;

encoding the first content ID into the first machine-readable code; and encoding a destination address associated with the server into the first machine-readable code, wherein the second request is received from the agent device based on the destination address in response to scanning the first machine-readable code by the agent device.

7. The method of claim 2, updating an agent interaction database storing agent interactive event information based on the second request comprises:

in response to the second request, generating a first agent interactive event ID representing a first agent interactive event associated with scanning the first machine-readable code; and creating a first agent interactive event entry in the agent interaction database, the first agent interactive event entry being identified by the first agent interactive event ID, wherein the first agent interactive event entry includes the search ID, the first content ID, and a first timestamp representing time associated with scanning the first machine-readable code.

8. The method of claim 1, further comprising, maintaining a user interaction database to store user interactive event information, the user interaction database including a plurality of user interactive event entries indexed by a plurality of user interactive IDs, each user interactive event entry corresponding to a user interactive event representing a user interaction with a particular content item.

9. The method of claim 8, further comprising:

receiving a signal indicating that the user accessed the first content from the user device, the signal including the first content ID;

in response to the signal, generating a first user interactive event ID representing a first user interactive event associated with accessing the first content item; and creating a first user interactive event entry in the user interaction database, the first user interactive event entry being identified by the first user interactive event ID, wherein the first user interactive event entry includes the search ID, the first content ID, and a second timestamp representing time associated with accessing the first content item.

10. The method of claim 1, further comprising maintaining a search event database to store search event information, the search event database including a plurality of search event entries indexed by a plurality of search IDs, each search event entry corresponding to a search event performed by the search engine.

11. The method of claim 10, further comprising:

in response to the first request, obtaining user device information of the user device based on the first request, the user device information including a device ID identifying the user device;

generating a user ID based on the user device information to represent the user of the user device; and creating a search event entry in the search event database based on the search ID to store the user ID, a content ID of each content item, and a keyword ID representing one or more keywords.

12. The method of claim 11, wherein creating a search event entry in the search event database further comprises for each of the content items, creating a search event entry in the search event database based on the search ID, and wherein the search event entry further stores a third timestamp representing time of searching based on the first request performed by the search engine.

13. A non-transitory machine-readable medium having executable instructions stored therein, which when executed by a processor, cause the processor to perform operations of routing data and connecting users based on user interactions with content, the operations comprising:

in response to a first request for query received at a server from a user device over a network, the query including one or more keywords, generating by a search engine hosted by the server a search identifier (ID) identifying a search transaction corresponding to the query;

extracting the one or more keywords from the query;

performing, by the search engine, a search within a content database based on the one or more keywords, generating a set of one or more content items;

for at least one of the content items, encoding, by an encoder, the search ID and a content ID identifying the content item into a machine-readable code using a predetermined encoding algorithm, and attaching the machine-readable code to the corresponding content item, the machine-readable code having the search ID and the corresponding content ID encoded therein;

generating a search result page by incorporating the content items therein, at least one of the content items in the search result page including a corresponding machine-readable code attached therein;

transmitting the search result page to the user device over the network such that the search result page is displayed on the user device, wherein detailed information of the at least one of the content items and the corresponding machine-readable code from the search result page are displayed on the user device when a user of the user device clicks on the at least one of the content items, the corresponding machine-readable code being scannable from the user device;

receiving at the server a second request from an agent device of an agent over the network, the second request including identifying information identifying a first machine-readable code associated with a first content item of the content items in the search result page;

in response to the second request, extracting by an interaction logging module the search ID and a first content ID from the identifying information;

determining a user ID identifying the user of the user device who initiated the first request based on the search ID and the first content ID; and compiling by a user profile compiler user information of the user based on information obtained from a user information database based on the user ID.

14. The non-transitory machine-readable medium of claim 13, wherein the operations further comprise:

in response to the second request, updating an agent interaction database storing agent interactive event information based on the second request, wherein the agent interaction database includes a plurality of agent interactive event entries indexed by a plurality of agent interactive IDs, each agent interactive event entry corresponding to an agent interactive event representing an agent interaction with a particular content item.

15. The non-transitory machine-readable medium of claim 14, wherein the identifying information identifying the first machine-readable code was obtained by the agent device by scanning the first machine-readable code presented at the user device as part of the search result page.

16. The non-transitory machine-readable medium of claim 14, wherein the operations further comprise:

transmitting the user information of the user from the server to the agent device to enable the agent to communicate with the user based on the user information.

17. The non-transitory machine-readable medium of claim 14, wherein the identifying information of the first machine-readable code contains the entire first machine-readable code, and wherein the method further comprises decoding the first machine-readable code to obtain the search ID and the first content ID.

18. The non-transitory machine-readable medium of claim 14, wherein encoding the search ID and a corresponding content ID into a machine-readable code comprises:

encoding the search ID into the first machine-readable code;

encoding the first content ID into the first machine-readable code; and encoding a destination address associated with the server into the first machine-readable code, wherein the second request is received from the agent device based on the destination address in response to scanning the first machine-readable code by the agent device.

19. A data processing system operating as a server, the system comprising:

a processor;

a memory coupled to the processor; and a search engine loaded in the memory and executed by the processor to perform operations of routing data and connecting users based on user interactions with content, the operations including in response to a first request for query received at a server from a user device over a network, the query including one or more keywords, generating by a search engine hosted by the server a search identifier (ID) identifying a search transaction corresponding to the query, extracting the one or more keywords from the query, performing, by the search engine, a search within a content database based on the one or more keywords, generating a set of one or more content items, for at least one of the content items, encoding the search ID and a content ID identifying the content item into a machine-readable code using a predetermined encoding algorithm, and attaching the machine-readable code to the corresponding content item, the machine-readable code having the search ID and the corresponding content ID encoded therein, generating a search result page by incorporating the content items therein, at least one of the content items in the search result page including a corresponding machine-readable code attached therein, transmitting the search result page to the user device over the network such that the search result page is displayed on the user device, wherein detailed information of the at least one of the content items and the corresponding machine-readable code from the search result page are displayed on the user device when a user of the user device clicks on the at least one of the content items, the corresponding machine-readable code being scannable from the user device, receiving a second request from an agent device of an agent over the network, the second request including identifying information identifying a first machine-readable code associated with a first content item of the content items in the search result page, in response to the second request, extracting by an interaction logging module the search ID and a first content ID from the identifying information, determining a user ID identifying the user of the user device who initiated the first request based on the search ID and the first content ID, and compiling by a user profile compiler user information of the user based on information obtained from a user information database based on the user ID.

20. The system of claim 19, wherein the operations further include:

in response to the second request, update an agent interaction database storing agent interactive event information based on the second request, wherein the agent interaction database includes a plurality of agent interactive event entries indexed by a plurality of agent interactive IDs, each agent interactive event entry corresponding to an agent interactive event representing an agent interaction with a particular content item.

21. The system of claim 20, wherein the identifying information identifying the first machine-readable code was obtained by the agent device by scanning the first machine-readable code presented at the user device as part of the search result page.

22. The system of claim 20, wherein the operations further include:

transmitting the user information of the user from the server to the agent device to enable the agent to communicate with the user based on the user information.

23. The system of claim 20, wherein the identifying information of the first machine-readable code contains the entire first machine-readable code, and wherein the method further comprises decoding the first machine-readable code to obtain the search ID and the first content ID.

24. The system of claim 20, wherein encoding the search ID and a corresponding content ID into a machine-readable code comprises:
- encoding the search ID into the first machine-readable code;
- encoding the first content ID into the first machine-readable code; and
- encoding a destination address associated with the server into the first machine-readable code, wherein the second request is received from the agent device based on the destination address in response to scanning the first machine-readable code by the agent device.

* * * * *